United States Patent [19]
Schmitt et al.

[11] Patent Number: 5,120,115
[45] Date of Patent: Jun. 9, 1992

[54] BRAKE BOOSTER

[75] Inventors: Edgar Schmitt, Vaihingen/Enz; Heinz Siegel, Stuttgart; Ewald Huebl, Schwieberdingen; Klaus Mueller, Tamm; Manfred Himmelsbach, Villingen-Schwenningen; Martin Jordan, Koblenz, all of Fed. Rep. of Germany

[73] Assignee: Robert Bosch GmbH, Stuttgart, Fed. Rep. of Germany

[21] Appl. No.: 584,959

[22] Filed: Sep. 19, 1990

[30] Foreign Application Priority Data

Sep. 27, 1989 [DE] Fed. Rep. of Germany ....... 3932148

[51] Int. Cl.⁵ .................................................. B60T 8/44
[52] U.S. Cl. ............................ 303/113 TR; 303/114 R; 60/547.1
[58] Field of Search ...................... 303/113 TR, 114; 60/547.1

[56] References Cited

U.S. PATENT DOCUMENTS

| | | |
|---|---|---|
| 4,240,330 | 12/1980 | Farr .................................. 74/107 X |
| 4,678,243 | 7/1987 | Lieber ........................ 303/114 R X |
| 4,681,375 | 7/1987 | Belart .............................. 303/114 R |
| 4,687,259 | 8/1987 | Reinartz et al. ............... 60/547.1 X |
| 4,815,793 | 3/1989 | Reinartz et al. . |
| 4,875,338 | 10/1989 | Lieber et al. . |

Primary Examiner—Robert J. Oberleitner
Assistant Examiner—Lee W. Young
Attorney, Agent, or Firm—Edwin E. Greigg; Ronald E. Greigg

[57] ABSTRACT

A brake booster for a pressure-fluid-actuated, and in particular hydraulic, brake system equipped with both ABS and traction control has a servo piston that is controllable by a brake pedal, and an additional piston that is controllable via a magnetic valve assembly in traction control operation; to control a brake pressure in the brake system, both pistons act via a pressure rod upon the brake piston of a master brake cylinder. For the sake of a short structural length of the brake booster, the additional piston is embodied as an annular piston, which coaxially surrounds the pressure rod and is sealed off from it, and which rests on a radially protruding driver element of the pressure rod in order to displace it.

24 Claims, 3 Drawing Sheets

BRAKE BOOSTER

BACKGROUND OF THE INVENTION

The invention is based on a brake booster for a pressure fluid actuated and in particular hydraulic brake system having anti-skid control (ABS) and traction control (ASR), in motor vehicles, of the type defined hereinafter.

In a known brake booster of this type (German Patent Document 36 29 776 A1), the additional piston for the traction control function is disposed between the pressure rod of the brake piston of the master brake cylinder of the brake system, in a housing chamber separate from the servo piston. In the housing chamber, the additional piston defines a pressure fluid chamber that communicates via a housing connection with the valve assembly comprising two 2/2-way magnetic valves. The pressure rod, which is in one piece with the servo piston, rests on the piston face of the additional piston acted upon by the pressure in the pressure fluid chamber, and the additional piston in turn acts with an integral piston rod upon the brake piston in the master brake cylinder. Upon actuation of the brake pedal, the servo piston, acted upon by pressure fluid via a valve opened by the brake pedal, displaces the additional piston via the pressure rod, and the additional piston via its piston rod displaces the brake piston in the master brake cylinder; as a result, a brake pressure is built up in the work chambers of the master brake cylinder and reaches the wheel brakes, via separate brake circuits. In traction control operation, via one of the two 2/2-way magnetic valves, pressure fluid that is at reservoir pressure is fed into the pressure fluid chamber that acts upon the additional piston. With the servo piston stationary, the additional piston is displaced and in turn displaces the brake piston in the master brake cylinder, so that once again a brake pressure is built up in the master brake cylinder. The magnetic valves in the brake circuits between the master brake cylinder and the wheel brakes that are present for ABS control are simultaneously triggered by the traction control apparatus, in such a way that only the wheel at which a loss of traction occurs, which in other words is spinning, is subjected to the brake pressure.

A brake booster of this kind has a relatively long axial structure, because of the need for an additional piston for the traction control function. The brake piston to be jointly displaced upon each brake pedal actuation is sealed off from the housing chamber by a sealing ring, which necessitates increased force for displacing the brake pedal. Moreover, a restoring spring must be provided between the brake pedal that controls the servo piston and the brake booster housing, to prevent the brake pedal from collapsing upon being actuated during or immediately after traction control operation. This restoring spring further increases the structural length of the brake booster and means that a higher actuating force is required for the brake pedal.

OBJECT AND SUMMARY OF THE INVENTION

The brake booster according to the invention has the advantage that despite the existing traction control function of the brake booster, its structural length is no greater than that of the conventional brake boosters lacking this traction control function. The additional piston surrounding the pressure rod, embodied as an annular piston, does not require any additional structural space in the axial direction. Moreover, the annular piston upon brake pedal actuation is not moved along with it but instead is left in its unactuated basic position. The seal required between the pressure rod and the annular piston has low friction and does not markedly reduce the ease of actuation during normal braking operations.

In an advantageous embodiment of the invention, the annular piston and the servo piston define a pressure fluid chamber located between them, which can be made to communicate via the valve assembly in alternation with a pressurized pressure fluid reservoir and a relief chamber. In traction control operation, the servo piston thus experiences a restoring force that retains the servo piston in its basic position, so that the pressure rod and servo piston are moved apart from one another. This restoring force prevents a disturbing collapse of the brake pedal if the brake pedal is actuated rapidly directly following traction control operation. The known restoring spring on the brake pedal or servo piston can be dispensed with. By means of a corresponding centering between the servo piston and the pressure rod, the communication between the servo piston and the pressure rod can be re-established once the traction control function has been rescinded and after the associated restoration of the annular piston.

In a further embodiment of the invention, the piston face, defining the pressure fluid chamber, of the annular piston is dimensioned such that a displacement of the annular piston until a brake pressure in the master brake cylinder that blocks the driven wheels of the motor vehicle is tripped requires only a fraction of the pressure fluid pressure prevailing in the pressure fluid reservoir. The maximum pressure fluid pressure in the pressure fluid chamber acting upon the annular piston is reduced to this fraction by means of a pressure limiter. Thus upon actuating the brake pedal during traction control operation, the driver does not encounter a rigid brake pedal, but rather a brake pedal that is actuatable with increased braking force. Pedal collapse is reliably prevented, and the known restoring spring between the brake pedal or servo piston and the housing of the brake booster can be dispensed with.

In a preferred embodiment of the invention the annular piston defines an annular pressure fluid chamber that is coaxial with the servo piston in the housing of the brake booster; the pressure fluid chamber can be made to communicate via the valve assembly in alternation with a pressurized pressure fluid reservoir and a relief chamber. The pressure rod is embodied as two parts and is hollow cylindrical on its end portion oriented toward the servo piston. The pressure tappet forming the second part of the pressure rod is displaceably guided in the interior of the hollow-cylindrical end portion and is supported at one end on the servo piston and at the other on the bottom of the hollow-cylindrical end portion. A damping device which is effective only in the direction of the plunge of the pressure tappet into the hollow-cylindrical end portion is provided between the pressure rod and the pressure tappet. With the structure of the brake booster embodied in this way, the servo piston in traction control operation is retained in the basic position only by friction and by a step on the servo piston acted upon by the reservoir pressure. In traction control operation pressure fluid force is not exerted upon the servo piston, so that the driver, upon a possible braking event during braking in traction control operation, will not encounter a rigid brake pedal or one that is hard to move. The damping provided prevents rapid collapse of the brake pedal upon actuation during traction control operation or immediately thereafter, so that once again the known restoring spring between the brake pedal and the brake booster housing can be dispensed with. The annular pressure fluid chamber can also be embodied such that the pressure fluid volume necessary for displacing the annular piston is small, so that the traction control intervention occurs quickly.

In another embodiment of the invention, the damping device is embodied by a larger-diameter piston segment of the pressure tappet that rests on the inner wall of the hollow-cylindrical end portion, leaving a throttle gap and a damping chamber enclosed between the piston portion and the bottom of the hollow-cylindrical end portion. Upon displacement of the servo piston the pressure tappet is displaced as well, so that a damping cushion of pressure fluid forms in the damping chamber.

In order that the traction control operation can ensue rapidly despite the damping, a further embodiment of the invention provides that an axial relief groove is provided in the inner wall of the hollow-cylindrical portion, ending at a distance before the bottom o the hollow-cylindrical end portion. The distance is selected such that the piston section emerges from the relief groove only a few millimeters before striking the pressure tappet at the bottom of the hollow-cylindrical end portion. Via the relief groove, in traction control operation, pressure fluid is reaspirated rapidly enough into the damping chamber defined by the bottom of the hollow-cylindrical end portion and the piston portion, and a braking effect of the damping apparatus upon the annular piston is thus prevented.

The invention will be better understood and further objects and advantages thereof will become more apparent from the ensuing detailed description of preferred embodiments taken in conjunction with the drawings.

DESCRIPTION OF THE EXEMPLARY EMBODIMENTS

Figure 1:
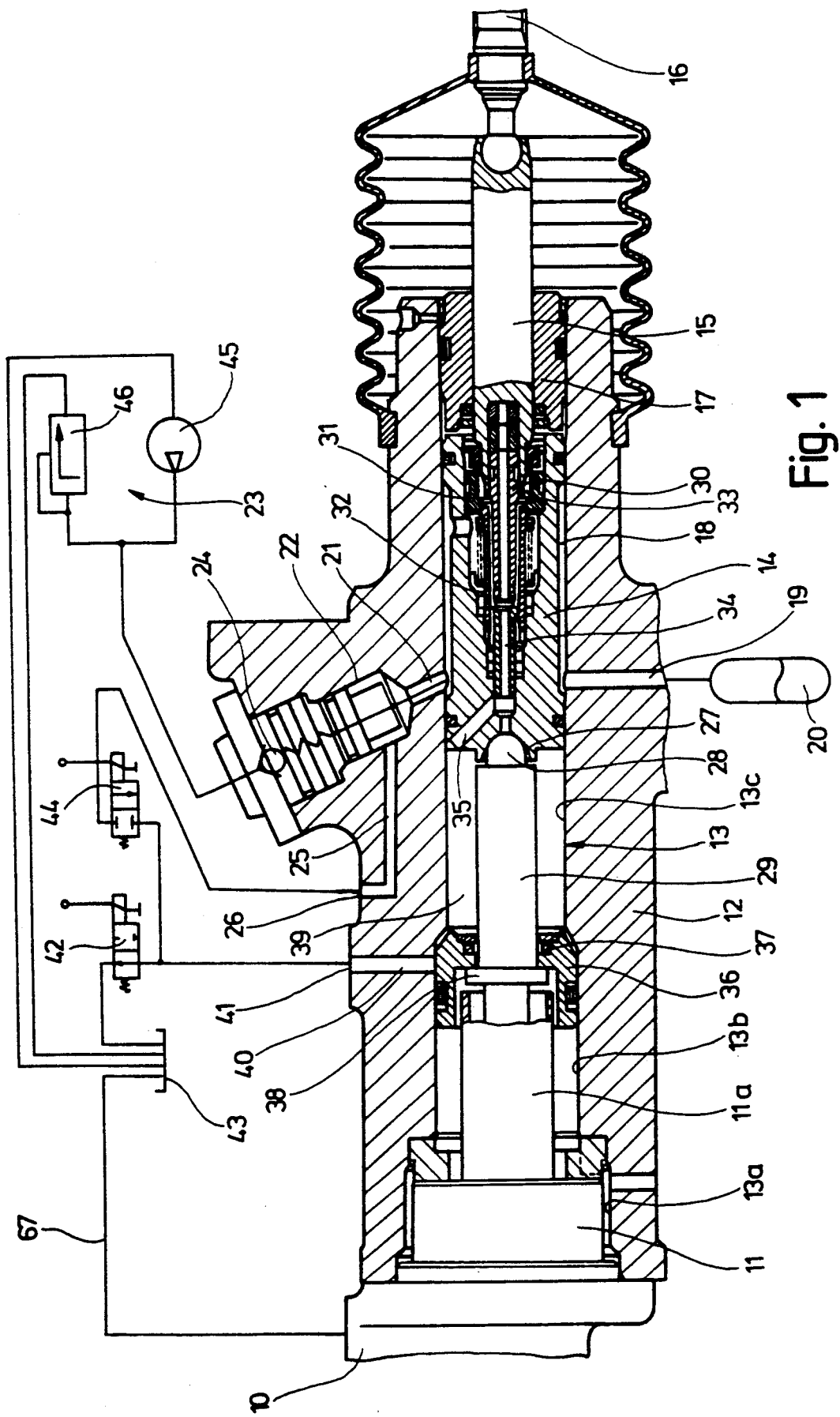
FIGS. 1-3 each show a longitudinal section through a brake booster with the peripheral region schematically shown, for a hydraulic brake system of a motor vehicle in accordance with three exemplary embodiments.

The brake boosters shown in longitudinal section in the drawings are intended for installation in a hydraulic brake system of a motor vehicle that is equipped with both anti-skid control (ABS) and traction control (ASR). The brake booster is disposed between a brake pedal (not shown) of the motor vehicle and a brake piston 11 guided in a master brake cylinder 10 of the brake system, and it converts the braking force applied to the brake pedal into a boosted displacement force at the brake piston 11 in the master brake cylinder 10, so that a brake pressure is controlled in the master brake cylinder 10. Connected to the master brake cylinder 10, which is conventionally embodied as a tandem cylinder, are two brake lines that lead to magnetic valves of the ABS apparatus. The magnetic valves communicate in turn with the wheel brakes of the various wheels. The structure and operation of the brake system having an ABS apparatus are known and are described for instance in German Patent Document 36 29 776 A1, so that no further details of this ABS braking function need be described here.

In the exemplary embodiment of FIG. 1, the brake booster has a housing 12 with a stepped bore 13 longitudinally penetrating it and composed of bore segments 13a, 13b and 13c. The brake piston 11 of the master brake cylinder 10 which is flanged on at the end protrudes into the bore segment 13a having the largest diameter; the brake piston 11 continues with a hollow-cylindrical extension 11a of reduced diameter leading into the adjoining bore segment 13b. A servo piston 14 is axially displaceably guided in the bore segment 13c of smallest diameter that follows the bore segment 13b; the servo piston is connected in turn via a piston rod 15 with an actuating rod 16 that is displaceable by the brake pedal. On its face end the bore segment 13c is closed in a fluid-tight manner with a closure collar 17, in which the piston rod 15 is displaceably guided. The servo piston 14 is provided over a substantial portion of its length with an annular groove that together with the bore segment 13c forms an annular chamber 18 that is closed on both ends. This annular chamber 18 communicates via a first bore 19 with a pressure reservoir 20 and via a second bore 21 with a valve receiving bore 22 in the housing 12. A check valve 24 that communicates with a pressure supply apparatus 23 and has an open direction toward the annular chamber 18 is inserted into the valve receiving bore 22. The open direction of the check valve 24 is symbolically represented in FIG. 1. From the bottom of the valve receiving bore 22, a third bore 25 in the housing 12 also leads to the outside and discharges into a housing connection 26, so that the annular chamber 18 also communicates directly with this housing connection 26. A pressure rod 29 having a centering nose portion 28 is located in a centering depression 27 disposed on the face end of the servo piston 14; the pressure rod 29 is connected in a positively engaged or form-fitting manner with the brake piston 11 of the master brake cylinder 10. The connection between the pressure rod 29 and the servo piston 14 is effected by positive engagement counter to the displacement direction of the servo piston 14, and the restoring force is brought to bear by the brake piston 11 or by a restoring spring, not shown.

Accommodated in the servo piston 14 is a valve unit that has a valve slide 30 connected to the piston rod 15; the valve slide cooperates with an outer valve seat 31 and an inner valve seat 32. Upon opening or closure of the outer valve seat 31, a communication between a work chamber 33 of the servo piston 14 and the annular chamber 18 is established or broken. With the opening or closing of the inner valve seat 32, a communication between the work chamber 33 and a relief bore 34 in the servo piston 14 is established or closed. The relief bore 34 discharges via an oblique bore 35 at the end of the servo piston 14 oriented toward the pressure rod 29.

An annular piston 36 that coaxially surrounds the pressure rod 29 and is sealed off from it with a sealing ring 37 is axially displaceably guided in the middle bore segment 13b. The annular piston 36 is capable of sliding on the pressure rod 29, and in its unactuated basic position it rests on a flange-like driver element 38 on the pressure rod 29. If the annular piston 36 moves in the same displacement direction as the servo piston 14 upon brake pedal actuation, or in other words if it moves to the left as seen in FIG. 1, then via the driver element 38 it carries the pressure rod 29 along with it. Contrarily, if the pressure rod 29 is displaced via the servo piston 14, then the pressure rod 29 slides through the annular piston 36, which remains in its position of repose. The annular piston 36, along with the axially opposite end face of the servo piston 14, defines a hydraulic chamber 39 that communicates with a radial bore 40 discharging in the bore segment 13a. The radial bore 40 leads outward in the housing 12 and there discharges in a housing connection 41. The housing connection 41 communicates via a 2/2-way magnetic valve 42, which is open when without current, with a hydraulic collecting tank 43, to which the known refill tank in the master brake cylinder 10 is also connected via a connecting line 67, while the housing connection 26 is connected, via a 2/2-way magnetic valve 44 that is closed when without current, to the inlet, communicating with the housing connection 41, of the 2/2-way magnetic valve 42. The pressure supply apparatus 23, in a known manner, comprises a motor-driven feed pump 45, the inlet of which communicates with the collecting tank 43, and a pressure limiter 46 connected parallel to the feed pump 45. Via the check valve 24 and the annular chamber 18, the feed pump 45 puts the pressure reservoir 20 at a reservoir pressure specified by the pressure limiter 46 for instance 200 bar. The 2/2-way magnetic valve 42, 44 are controlled by the traction control apparatus, not shown here, which is simultaneously also capable of controlling the magnetic valves required for the ABS control that are disposed between the master brake cylinder 10 and the wheel brakes.

The mod of operation of the brake booster is a follows:

If the brake pedal is actuated, then the servo piston 14 is displaced to the left in FIG. 1 via the piston rod 15, and the valve slide 30 closes the inner valve seat 32 and opens the outer valve seat 31. Pressure fluid at reservoir pressure flows into the work chamber 33 and reinforces the displacement motion of the servo piston 14. The servo piston 14 actuates the pressure rod 29, which in turn actuates the brake piston 11 of the master brake cylinder 10, so that brake pressure is fed into both brake circuits of the brake system. If the driver lets up on the brake pedal, then via the valve slide 30 the outer valve seat 31 is closed and the inner valve seat 32 is opened. By the restoring action of the brake piston 11 in the master brake cylinder 10, the pressure rod 29 and thus the servo piston 14 are displaced to the right in FIG. 1, causing pressure fluid from the work chamber 33 to flow via the relief bore 34 and the oblique bore 3 into the hydraulic chamber 39, and from there it can flow out via the radial bore 40 and the opened magnetic valve 42 into the collecting tank 43 which is not under pressure.

If a loss of traction arises at a driven wheel, then the two 2/2-way magnetic valves 42, 44 and all the magnetic valves of the ABS apparatus are triggered by the traction control apparatus. In this process the magnetic valves of the ABS apparatus are switched such that all the wheel brakes are blocked off from the master brake cylinder 10. The two 2/2-way magnetic valves 42, 44 switch over into their other position, in which the hydraulic chamber 39 is blocked off from the collecting tank 43 by the magnetic valve 42 and communicates with the pressure reservoir 20 via the magnetic valve 44 and the housing connection 26. Thus pressure fluid at the pressure of the reservoir 20 flows into the hydraulic chamber 39 and displaces the annular piston 36 to the left in FIG. 1. Via the driver element 38, the annular piston 36 carries the pressure rod 29 with it, and the pressure rod displaces the brake piston 11 in the master brake cylinder 10. A brake pressure is controlled in the work chambers of the master brake cylinder 10. Now, the magnetic valve associated with the wheel brake for the wheel that has lost traction or in other words is spinning is switched back again by the traction control apparatus. The wheel is braked until the traction loss is zero. Then the magnetic valves 42, 44 are rest, as a result of which the hydraulic chamber 39 is disconnected, via the blocking magnetic valves 44, from the pressure reservoir 20 and again communicates, via the opening magnetic valve 42, with the collecting tank 43. The pressure fluid present in the hydraulic chamber 39 flows out into the collecting tank 43, and the annular piston 36 is returned to its outset position via the driver element 38 by the pressure bar 29 that has been returned by the brake piston 11 of the master brake cylinder 10. In the terminal position of the annular piston 36, the centering extension 28 on the pressure rod 29 automatically centers itself in the centering depression 27 in the servo piston 14, thereby re-establishing the communication between the servo piston 14 and the pressure rod 29.

Figure 2:
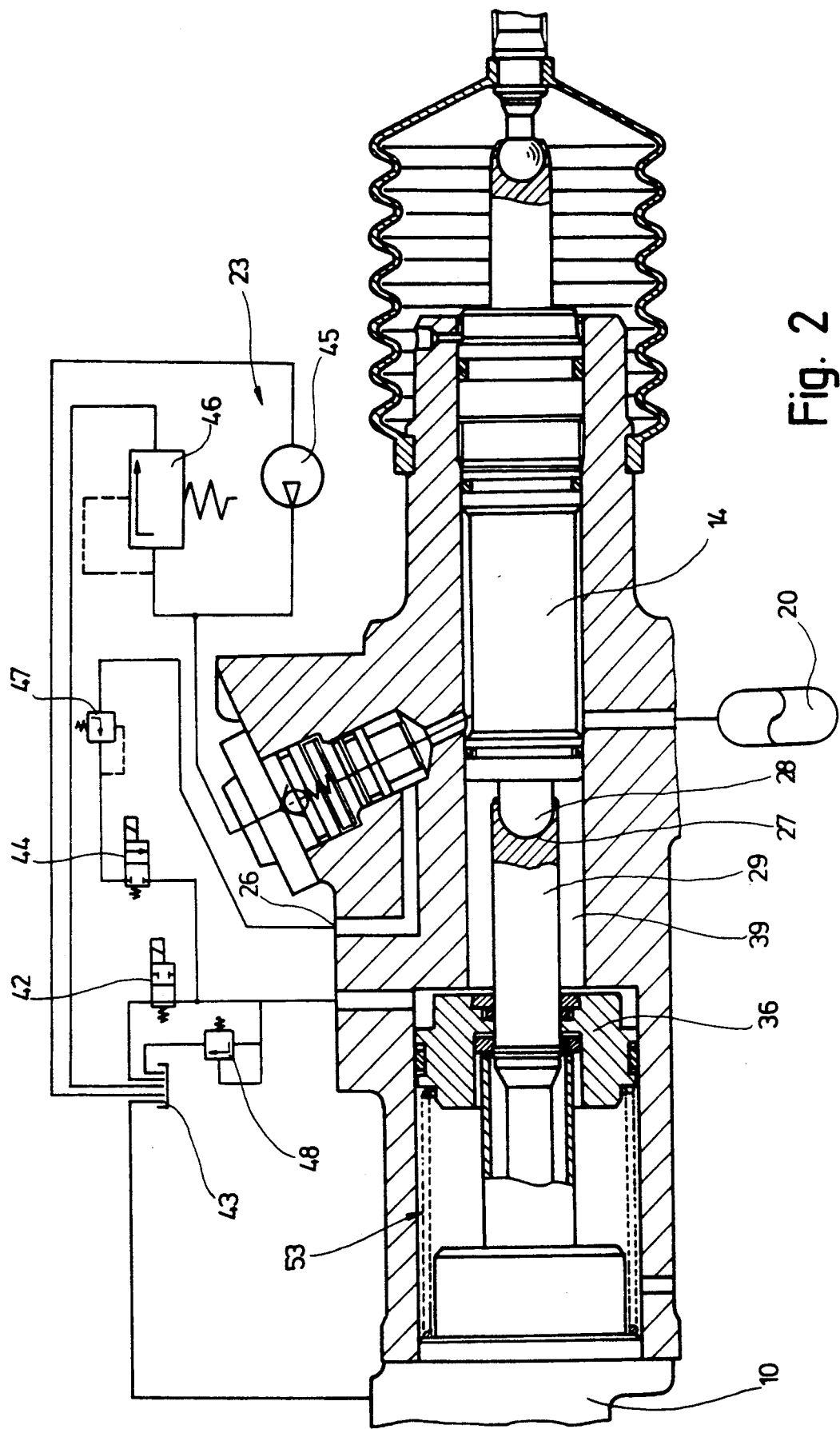

The brake booster shown in longitudinal section in FIG. 2 differs from that described above and shown in FIG. 1 in that instead of reservoir pressure prevailing in the hydraulic chamber 39 between the servo piston 14 and the annular piston, a working pressure that is reduced to a fraction of the reservoir pressure is fed in. To this end, a pressure limiter 47 is incorporated in the connecting line between the housing connection 26 and the 2/2-way magnetic valve 44, limiting the reservoir pressure to working pressure. At a reservoir pressure of 200 bar in the pressure reservoir 20, the pressure limiter 47 is set such that when the magnetic valve 44 is opened, the working pressure building up in the hydraulic chamber 39 amounts to a maximum of 30 to 35 bar. Additionally, the piston area, defining the hydraulic chamber 39, of the annular piston 36 is dimensioned such that the working pressure of a maximum of 30 to 35 bar that is fed into the hydraulic chamber 39 suffices to displace the annular piston 36 far enough that a brake pressure that blocks the driven wheels can be controlled in the master brake cylinder 10. Making this modification has the advantage that during the traction control function the feedback of the working pressure in the hydraulic chamber 39 upon the servo pressure 14 is substantially less. Upon actuating the brake pedal, the driver thus does not encounter a rigid brake pedal, as in the case of the brake booster of FIG. 1, but rather a brake pedal that merely needs to be actuated with a somewhat increased braking force If return pumping of pressure fluid through the feed pump 45 is needed to decrease pressure during traction control operation or in other words to reduce the working pressure in the hydraulic chamber 39, as is the case with "ABS 2" equipment, then the pressure limiter 48 connected between the housing connection 41 and the collecting tank 4 in FIG. 2 should be provided. The limiting pressure of the pressure limiter 48 is set to be slightly greater than the limiting pressure of the pressure limiter 47. For the sake of completeness, it should be noted that in the brake booster of FIG. 2, a separate restoring spring 53 is provided, which is supported between the annular piston 36 and the master brake cylinder 10. For centering the pressure rod 29 and servo piston 14, the centering depression 27 and the centering extension 28 are reversed, compared with FIG. 1; that is, each is disposed on the respectively other component. Otherwise, the brake booster is the same as that of FIG. 1, so that the other components need not be described in detail.

Figure 3:
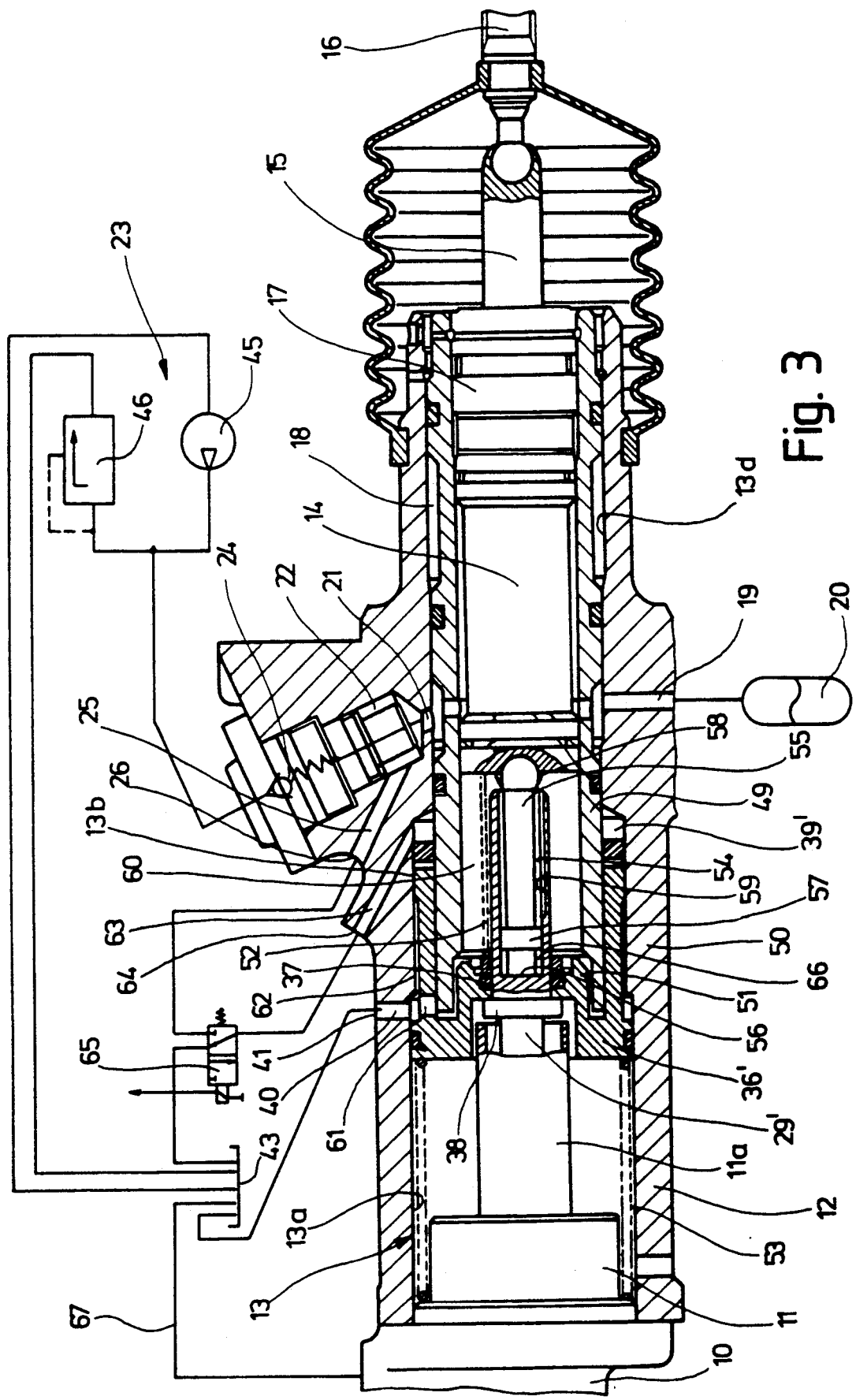

In the brake booster shown in longitudinal section in FIG. 3, the hydraulic chamber 39' is not defined by the annular piston 36' and the servo piston 14 as in the case of the brake boosters in FIGS. 1 and 2, but only by the annular piston 36'. To this end, an intermediate sleeve 49 is inserted into the bore segment 13c, and the servo piston 14 is axially displaceably guided in this sleeve, forming the annular chamber 18. At its end oriented toward the annular piston 36', an end portion of the intermediate sleeve 49 protrudes into the bore segment 13b of larger diameter and together with the bore wall of that segment forms the annular hydraulic chamber 39', which is closed off on the bottom by the shoulder at the transition between the bore segments 13b and 13c. The cup-shaped annular piston 36' protrudes inward into the hydraulic chamber 39' and defines it; the hydraulic chamber 39' is open at one end. A hollow-cylindrical post 51 protrudes from the annular piston 36' coaxially with the rim 50 of the cup thereof, and this post surrounds the pressure rod 29' and is sealed off from it in a fluid-tight manner with the sealing ring 37. A compression spring 52 is supported between the post 51 and the servo piston 14, while the face end of the annular piston 36' remote from the post 51 is acted upon by a restoring spring 53, which is supported on the housing of the flanged-on master brake cylinder 10. By comparison with the brake boosters of FIGS. 1 and 2, the volume of the annular hydraulic chamber 39' is quite small, so that the pressure fluid volume required to displace the annular piston 36' is relatively small, and thus the traction control intervention takes place relatively fast.

The pressure bar 29' is embodied in two parts here and has a hollow-cylindrical end portion 54, in the interior of which a pressure element 55 forming the second part of the pressure rod 29' is guided. The pressure element 55 is supported positively, in the basic position of the annular piston 36', between the bottom 56 of the hollow-cylindrical end portion 54 of the pressure rod 29' and the servo piston 40', and is additionally retained by a crimped edge 58 on the servo piston 14. The pressure element 55 has a piston segment 57 of larger diameter, spaced apart by a distance from the free end; this portion 57 is located opposite the inner wall of the hollow-cylindrical end portion 54, leaving a throttle gap, and with the bottom 56 thereof adapted to enclose a damping chamber 66. An axially extending relief groove 59 is provided in the inner wall of the hollow-cylindrical portion 54 and terminates at a distance before the bottom 56 of the hollow-cylindrical end portion 54. This distance is selected such that the piston segment 57 of the pressure element 55 leaves the vicinity of the relief groove 59 a few millimeters before meeting the pressure element 55 at the bottom 56.

The relief chamber 60 defined by the servo piston 14 and the post 51 of the annular piston 36', into which chamber as in FIGS. 1 and 2 the oblique bore 35 leading to the relief bore 34 in the servo piston 14 discharges, communicates via an opening 61 in the cup rim 50 of the annular piston 36' with the radial bore 14, provided with the connection 41, in the housing 12. So that the communication will be maintained during the displacement of the annular piston 36', the annular piston 36' has an axial groove 62 that discharges in the opening 61.

The housing connection 41 communicates directly with the hydraulic collecting tank 43. Leading to the hydraulic chamber 39' is a fourth bore 63 in the housing 12, which discharges into a further housing connection 64. Instead of the two 2/2-way magnetic valves in the brake boosters of FIGS. 1 and 2, one 3/2-way magnetic valve 65 is provided here, which is controlled again by the traction control apparatus. Of the three controlled connections of the 3/2-way magnetic valve 65, the first valve connection communicates with the housing connection 64; the second valve connection communicates with the hydraulic collecting tank 43; and the third valve connection communicates with the housing connection 26. The 3/2-way magnetic valve 65 is embodied such that in its unexcited basic position it connects the first valve connection to the second valve connection, and in its excited switching position it connects this first valve connection to the third valve connection. Otherwise the structure of the brake booster is as described in connection with FIGS. 1 and 2, and so identical components are provided with the same reference numerals.

The mode of operation of the brake booster in traction control operation is the same as described for FIG. 1, except that during the traction control function the end of the servo piston 14 is not acted upon by reservoir pressure; instead, the relief chamber 60 defined by this piston is always without pressure. Upon displacement of the annular piston 36' by the pressure fluid fed in when the 3/2-way magnetic valve 65 is switched, the servo piston 14 is retained in its outset position only by the means of friction, by the compression spring 52, and by the piston shoulder defining the annular chamber 18. When the pressure element 55 is secured on the servo piston 14, the hollow-cylindrical end portion 54 of the pressure rod 29' and the pressure element 55 move relative to one another, and via the relief groove 59 pressure fluid flows into the damping chamber 66, defined by the piston segment 57 and the bottom 56 of the hollow-cylindrical end portion 64, so that the motion of the annular piston 36' is not braked. If during traction control operation or immediately thereafter the driver actuates the brake pedal, then a rapid collapse of the brake pedal is prevented by the damping tripped with the increasing plunging of the piston segment 57 into the interior of the hollow-cylindrical end portion 54. A few millimeters before the end of the pressure element 55 strikes the bottom 56 of the hollow-cylindrical end portion 54, the piston segment 57 emerges from the region of the relief groove 59; as a result, a very pronounced damping ensues until impact of the pressure element 55.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A brake booster for pressure-fluid-actuated hydraulic brake systems in motor vehicles having driver wheels comprising an anti-skid apparatus (ABS) and a traction control apparatus (ASR), a servo piston that is axially displaceably guided in a housing and can be acted upon by pressure fluid at high pressure, the imposition of pressure upon said piston is controllable by a brake pedal, and via a pressure rod engages a brake piston, guided in a master brake cylinder of the brake system, thereby to displace the brake piston axially in the master brake cylinder in a direction that trips a brake pressure control, an additional piston adapted to engage the brake piston to displace it in the same axial direction, said additional piston can be acted upon by the high-pressure pressure fluid and can be relieved of pressure via a valve assembly controlled by the traction control apparatus (ASR), the pressure rod (29, 29') rests positively on the servo piston (14) counter to the travel direction of the servo piston, and the additional piston is embodied as a coaxial annular piston (36, 36') adapted to surround the pressure rod (29, 29'), said annular piston is sealingly engaged with the pressure rod (29, 29') and rests on a radially protruding driver element (38) of the pressure rod (29, 29') in order to displace the pressure rod in the same displacement direction as that effected by the servo piston (14).

2. A brake booster as defined by claim 1, in which the annular piston (36) and the servo piston (14) define a pressure fluid chamber (39) located therebetween and said pressure fluid chamber is adapted to communicate via the valve assembly (42, 44) in alternation with a pressurized pressure fluid reservoir (20) and a relief chamber (43).

3. A brake booster as defined by claim 2, in which a centering means (27, 28) is provided between the servo piston (14) and the pressure rod (29), said centering means, upon restoration of the annular piston (36) when the imposition of pressure ceases, is adapted to automatically establish the positive connection of the pressure rod (29) and the servo piston (14).

4. A brake booster as defined by claim 2, in which the piston face defining the pressure fluid chamber (39) of the annular piston (36) is dimensioned to allow a displacement of the annular piston (36) until a brake pressure in the master brake cylinder (10) that blocks the driven wheels of the motor vehicle is tripped, requiring only a fraction of the pressure fluid pressure prevailing in the pressure fluid reservoir (20), and further the maximum pressure fluid pressure in the pressure fluid chamber (39) acting upon the annular piston (36) is reduced to said friction.

5. A brake booster as defined by claim 4, in which the maximum pressure fluid pressure occurring in the pressure fluid chamber (39) is arranged to vary from 30 to 35 bar, for a reservoir pressure of 200 bar prevailing in the pressure fluid reservoir (20).

6. A brake booster as defined by claim 5, in which a pressure limiter means (47) is disposed between the pressure fluid reservoir (20) and the pressure fluid chamber (39).

7. A brake booster as defined by claim 4, in which a pressure limiter means (47) is disposed between the pressure fluid reservoir (20) and the pressure fluid chamber (39).

8. A brake booster as defined by claim 7, in which the housing connection (41) additionally communicates with the relief chamber (43) via a second pressure limiting valve, the limiting pressure of said second pressure limiting valve being higher than the limiting pressure of the first pressure limiting valve (47).

9. A brake booster as defined by claim 2, in which the valve assembly has two 2/2-way magnetic valves (42, 44), one of which is located in a connecting line from a housing connection (41) that communicates with the pressure fluid chamber (39) to the pressure fluid reservoir (20), and the other of which is located in a connecting line from the housing connection (41) to the relief chamber (43).

10. A brake booster as defined by claim 9, in which the housing connection (41) additionally communicates with the relief chamber (43) via a second pressure limiting valve, the limiting pressure of said second pressure limiting valve being higher than the limiting pressure of the first pressure limiting valve (47).

11. A brake booster as defined by claim 2, in which the valve assembly has a 3/2-way magnetic valve (65) having three controlled valve connections, of which the first valve connection communicates with a housing connection (64) that is adapted to communicate with the pressure fluid chamber (39); the second valve connection being arranged to communicate with the pressure fluid reservoir (20); and the third valve connection arranged to communicate with the relief chamber (43).

12. A brake booster as defined by claim 1, in which a centering means (27, 28) is provided between the servo piston (14) and the pressure rod (29), said centering means, upon restoration of the annular piston 36 when the imposition of pressure ceases, is adapted to automatically establish the positive connection of the pressure rod (29) and the servo piston (14).

13. A brake booster as defined by claim 12, in which the piston face defining the pressure fluid chamber (39) of the annular piston (36) is dimensioned to allow a displacement of the annular piston (36) until a brake pressure in the master brake cylinder (10) that blocks the driven wheels of the motor vehicle is tripped, requiring only a fraction of the pressure fluid pressure prevailing in the pressure fluid reservoir (20), and further the maximum pressure fluid pressure in the pressure fluid chamber (39) acting upon the annular piston (36) is reduced to said fraction.

14. A brake booster as defined by claim 1, in which the annular piston (36') defines an annular pressure fluid chamber (39') that is coaxial with the servo piston (14) in the housing (12), said chamber adapted t communicate via the valve assembly (65) in alternation with a pressurized pressure fluid reservoir (20) and a relief chamber (43), the pressure rod (29') is embodied as two parts and is hollow cylindrical on an end portion (54) oriented toward the servo piston (40), in the interior of which end portion a coaxial pressure element (55) that is supported on the bottom (56) of the hollow-cylindrical end portion (54) and on the servo piston (14) is axially displaceable; and a damping device (57, 66), which is effective only in the direction of a plunge of the pressure element (55) into the hollow-cylindrical end portion (54) of the pressure rod (29'), is provided between the pressure rod (29') and the pressure element (55).

15. A brake booster as defined by claim 14, in which the damping device is embodied by a larger-diameter piston segment (57) of the pressure element (55) that is adapted to rest on the inner wall of the hollow-cylindrical end portion (54), leaving a throttle gap and a damping chamber (66) enclosed between the piston portion (57) an the bottom (56) of the hollow-cylindrical end portion (54).

16. A brake booster as defined by claim 15, in which an axial relief groove (59) is provided in the inner wall of the hollow-cylindrical portion (54), said groove adapted to terminate at a distance before the bottom (56) of the hollow-cylindrical end portion (54), and said distance is selected such that when the pressure element (55) rests on a bottom (56) of the hollow-cylindrical end portion (54), the piston segment (57) has emerged by a short displacement path from the region of the relief groove (59).

17. A brake booster as defined by claim 16, in which a compression spring (52) is supported between the servo piston (14) and the annular piston (36').

18. A brake booster as defined by claim 16, in which the pressure element (55) is additionally fixed in place by a crimping means (58) on the servo piston (14).

19. A brake booster as defined by claim 15, in which a compression spring (52) is supported between the servo piston (14) and the annular piston (36').

20. A brake booster as defined by claim 15, in which the pressure element (55) is additionally fixed in place by a crimping means (58) on the servo piston (14).

21. A brake booster as defined by claim 14, in which a compression spring (52) is supported between the servo piston (14) and the annular piston (36').

22. A brake booster as defined by claim 21, in which the pressure element (55) is additionally fixed in place by a crimping means (58) on the servo piston (14).

23. A brake booster as defined by claim 14, in which the pressure element (55) is additionally fixed in place by a crimping means (58) on the servo piston (14).

24. A brake booster as defined by claim 1, in which the annular piston (36; 36') is engaged by a restoring spring (53) in order to restore it after the disappearance of the pressure imposition.

* * * * *